United States Patent
Sardonico (10) Patent No.: US 6,558,106 B2
(45) Date of Patent: May 6, 2003

(54) FOLDAWAY LIFTING DEVICE FOR DISABLED PEOPLE IN WHEELCHAIRS AND CHILDREN'S PUSHCHAIRS

(75) Inventor: Gennaro Sardonico, Turin (IT)

(73) Assignee: Rollon S.p.A., Milan (IT)

( * ) Notice: Subject to any disclaimer, the term of this patent is extended or adjusted under 35 U.S.C. 154(b) by 0 days.

(21) Appl. No.: 09/873,379

(22) Filed: Jun. 5, 2001

(65) Prior Publication Data
US 2001/0048872 A1 Dec. 6, 2001

(30) Foreign Application Priority Data
Jun. 6, 2000 (IT) .................................... TO2000A0541

(51) Int. Cl.$^7$ ................................................. B60P 1/44

(52) U.S. Cl. ................. 414/556; 414/558; 414/917; 414/921; 254/10 R (58) Field of Search ................................. 414/558, 556, 414/821, 546, 557, 917, 540, 539; 105/426, 431; 254/10 R, 10 B, 10 C (56) References Cited

U.S. PATENT DOCUMENTS

| 4,281,744 A | * | 8/1981 | Koerber ................... 414/921 X |
| 4,711,613 A | * | 12/1987 | Fretwell ................... 414/921 X |
| 4,958,979 A | * | 9/1990 | Svensson ................. 414/921 X |
| 5,110,252 A | * | 5/1992 | Aoki ....................... 414/921 X |
| 5,553,990 A | * | 9/1996 | Kytola, Sr. ................ 414/659 |
| 5,975,830 A | * | 11/1999 | Goodrich et al. ........ 414/921 X |
| 6,095,747 A | * | 8/2000 | Cohn ...................... 414/921 X |
| 6,102,648 A | * | 8/2000 | Fretwell et al. .......... 414/921 X |
| 6,190,112 B1 | * | 2/2001 | Danilovie ............... 414/921 X |

* cited by examiner

Primary Examiner—Frank E. Werner
(74) Attorney, Agent, or Firm—Sughrue Mion, PLLC

(57) ABSTRACT

Lifting device (1) for disabled people in wheelchairs and children's pushchairs, comprising a supporting frame (2), permanently applied to a motor vehicle or a fixed installation, and a sliding foldaway platform (3) moving between a retracted position and an extracted position, with respect to said supporting frame (2). The platform (3) can also move in said extracted position, between a lowered position and a raised position, by means of an articulated parallelogram linkage system (17). The movements of the platform (3) are achieved by means of electrical actuators (9, 20).

4 Claims, 10 Drawing Sheets

FIG. 11

FOLDAWAY LIFTING DEVICE FOR DISABLED PEOPLE IN WHEELCHAIRS AND CHILDREN'S PUSHCHAIRS

BACKGROUND OF THE INVENTION

This invention relates in general to equipment for facilitating the access of disabled people and children's pushchairs aboard motor vehicles, i.e. public transport vehicles, or more simply to fixed installations, such as public buildings, museums and similar.

Specifically, this invention relates to a lifting device for disabled people in wheelchairs, intended to be permanently applied to a vehicle or to a fixed installation, to overcome the difference in level between a lower station and an upper station, for accessing said vehicle or said fixed installation.

SUMMARY OF THE INVENTION

The purpose of this invention is to provide a lifting device of this type which can be fully folded away, i.e. which is included in the volume of the vehicle, or of the fixed installation, to which it is applied, until its use is required.

An additional purpose of this invention is to provide a particularly functional foldaway lifting device, which conformation is relatively simple and cost-effective, and which does not employ fluid actuators.

According to this invention, this purpose is obtained essentially thanks to the fact that the lifting device comprises:

- a supporting frame embedded within a housing provided under said upper station of the vehicle or fixed installation,
- a sliding foldaway platform, moving between a retracted position and an extracted position, with respect to said supporting frame, and also moving, in said extracted position, between a lowered condition, in which it rests on said lower station, and a raised condition, in which it is substantially arranged on the level of said upper station,
- articulated parallelogram linkage means between said platform and said frame, and
- electrical actuator control means for moving said platform between said retracted position and said extracted position and, by means of said articulated parallelogram linkage means, between said lowered condition and said raised condition.

According to a preferred embodiment of this invention, said platform is conveniently equipped with a front board, moving between an erected position and a folded position, in which is acts as a front slide for accessing said lower station. Furthermore, the platform can be equipped with a rear extractable extension, sliding over the platform between a retracted position and an extracted position, in which it acts as a rear slide for connecting to the upper station. Electrical actuator means for controlling the movements of said front board and said sliding extension are provided.

The lifting device according to this invention can be advantageously equipped with a remote control device, or magnetic card, or similar, operatively associated with the respective control device for allowing also remote activation by the user.

BRIEF DESCRIPTION OF THE DRAWINGS

This invention will be better explained by the following detailed descriptions with reference to the accompanying figure as non-limiting example, wherein.

DETAILED DESCRIPTION OF THE INVENTION

The example of embodiment of the invention illustrated in the drawings refers to the application of the lifting device according to this invention on a public transport vehicle, for example a bus. It must be emphasised that the following description, expressly referred to said example of embodiment, is essentially identically applicable in the case of the application of the lifting device according to this invention to other types of vehicles, and also to fixed installations.

In the drawings, F refers to the floor of a bus accessible from the outside across a door D and a set of steps of which the intermediate step, located on a lower level with respect to the floor F, is indicated with S.

This step S presents a hollow shape and is normally closed (FIGS. 1 and 2) by the front extremity of a lifting device according to this invention, generally indicated with numeral 1, permanently applied and folded away inside the cavity of the step S.

With more detailed reference to FIG. 2, the lifting device 1 essentially comprises a stationary supporting frame 2 and a mobile platform, as explained below, with respect to the supporting frame 2.

The supporting frame 2 is generally U-shaped with a rear side 4 and to lateral sides 5 reciprocally connected by two transversal profiles 6, which define two essentially C-shaped longitudinal sliding guides 7. As better appears in FIGS. 4, 6 and 8, a first electrical geared motor 8, operating a worm screw system 9, extending along one of the lateral sides 5 and which function will be explained in the following description, is fastened to the rear side 4 of the supporting frame 2.

Figure 9:
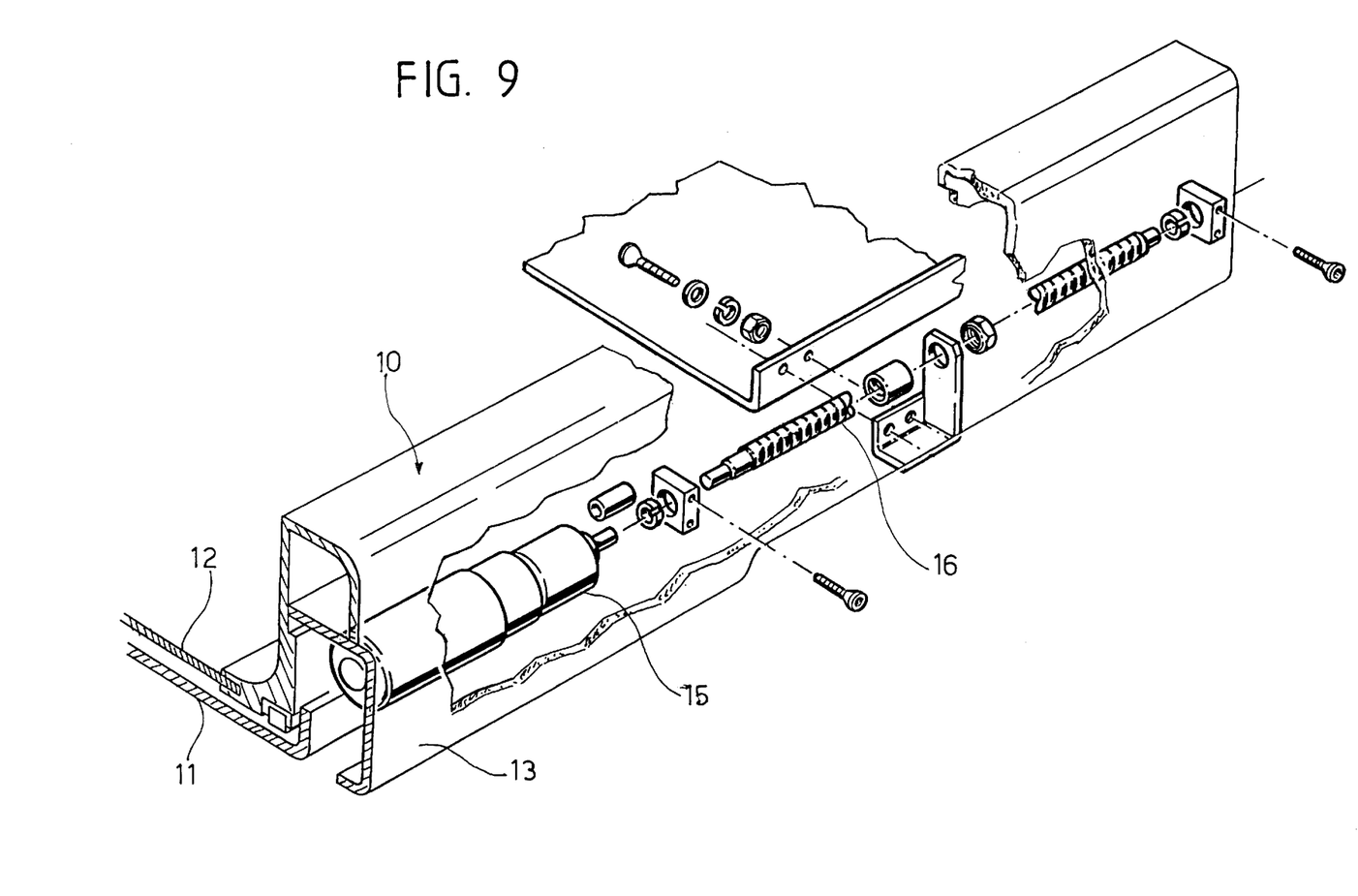
FIG. 9 is a perspective partial view on an exploded, larger scale of a detail of the platform of the lifting device.

The mobile platform 3 includes two longitudinal sides 10, consisting of contoured profiles shown in detail in FIG. 9, interconnected by a horizontal base 11 over which a structural plate 12 can be arranged, for example consisting of an embossed aluminium panel. The shape of the sides 10 is complementary to that of the guides 7 in which they slide.

An enlargement 13 is arranged on a side 10 near the front side of the platform 2.

Figure 3:
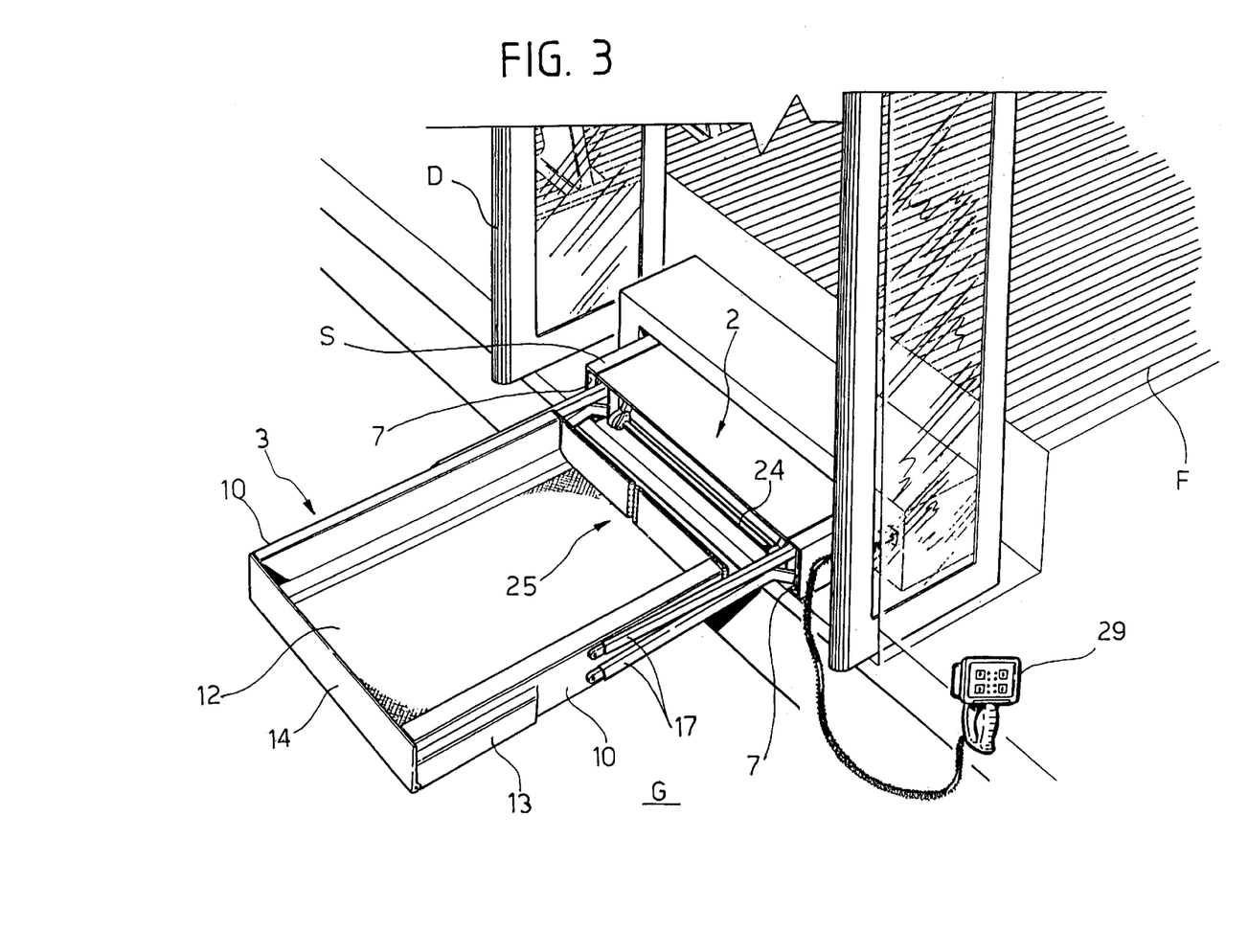
FIG. 3 is a similar view to FIG. 1 with the lifting device in extracted position.
Figure 4:
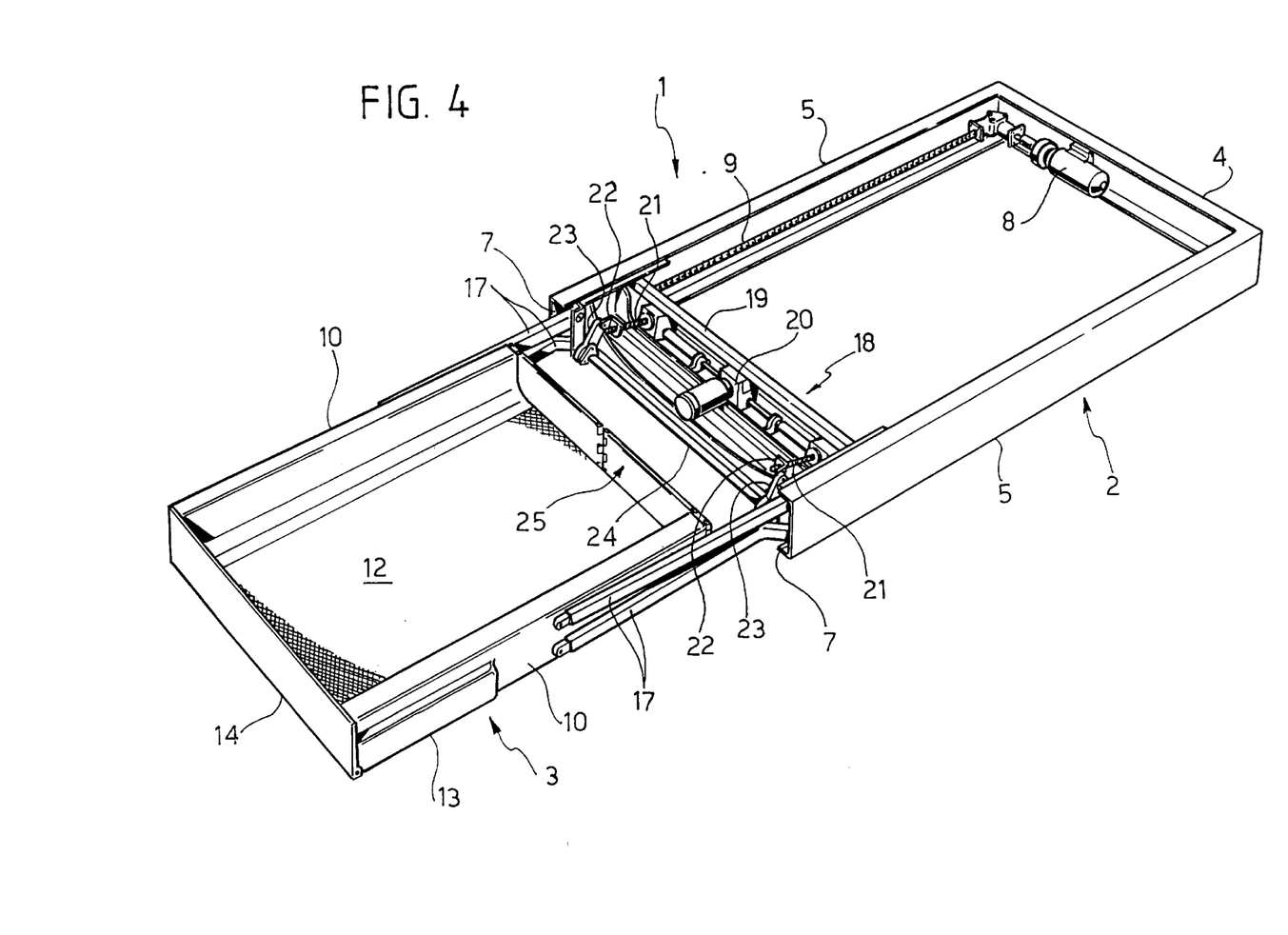
FIG. 4 is a similar view to that of FIG. 2 showing the lifting device in the extracted position of FIG. 3.
Figure 5:
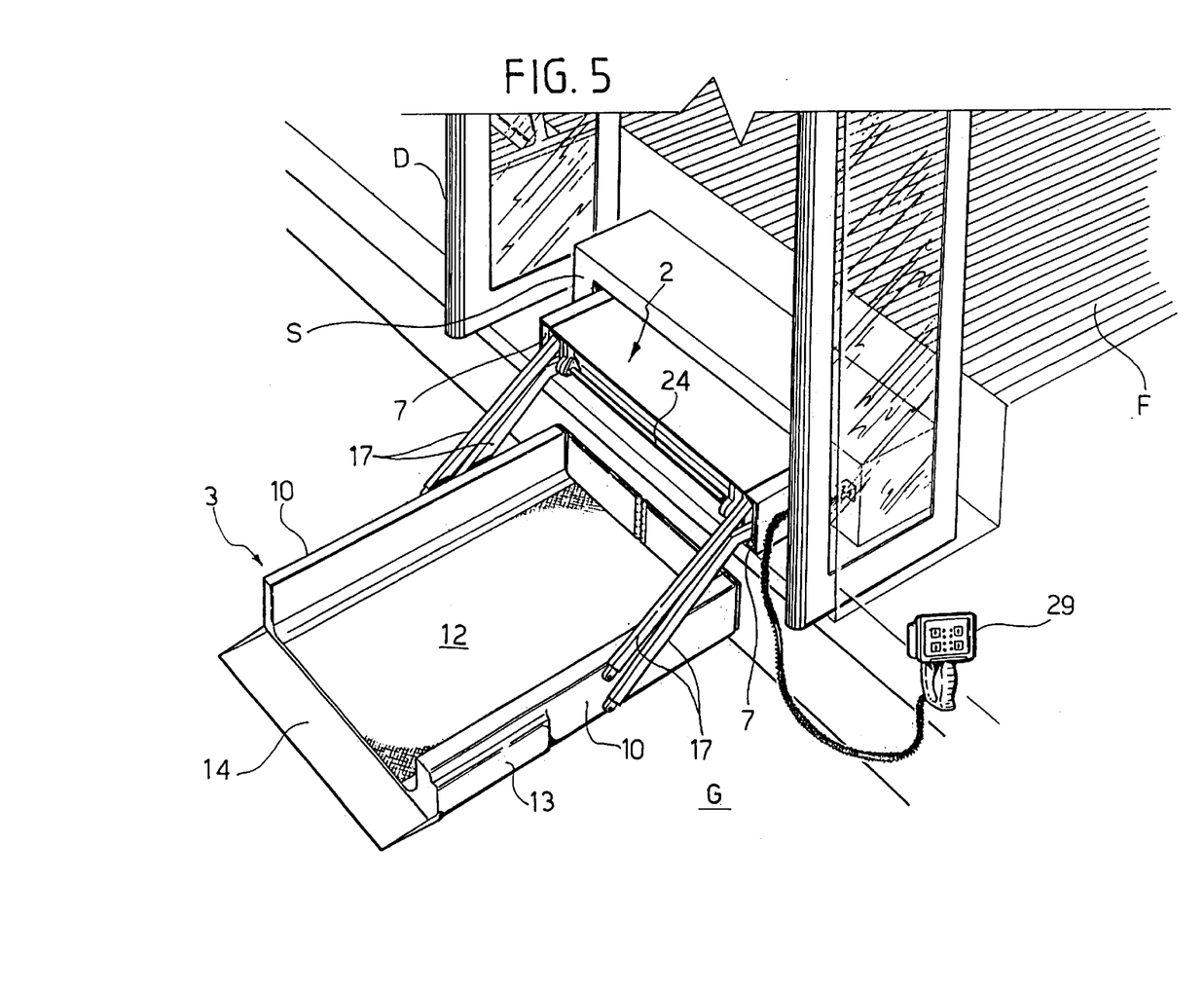
FIG. 5 is a similar view to FIG. 1 with the lifting device in lowered position.
Figure 6:
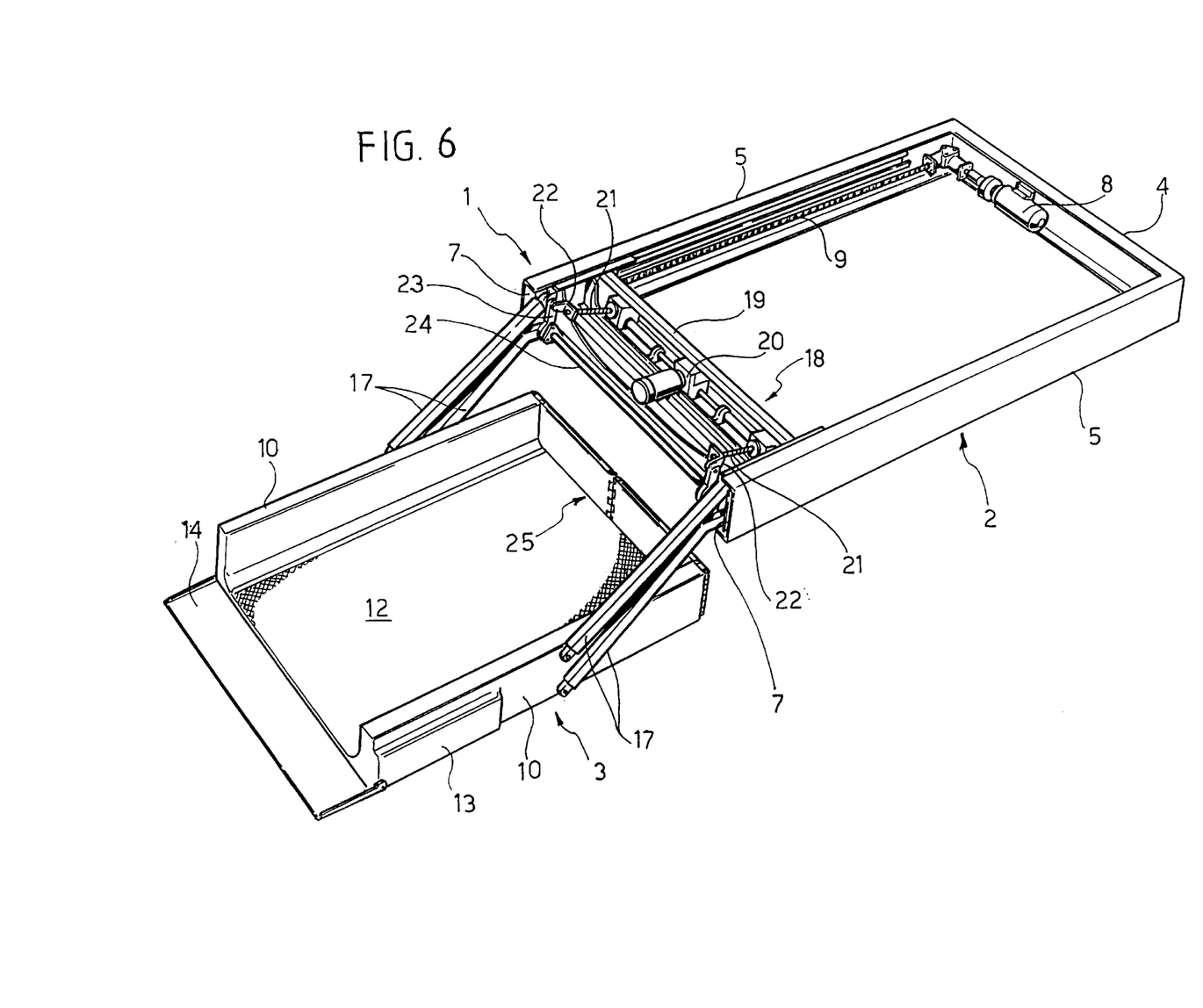
FIG. 6 is a similar view to FIG. 2 showing the lifting device in the lower condition of FIG. 5.

This front side consists of a board 14, which is articulated to the lower parts of the sides 10 of the platform 3 so to rock between an erected position, shown in FIGS. 1–4 and 7, 8, and a folded position, shown in FIGS. 5 and 6, in which it extends essentially along the extension of the base 11, acting as a front board 14. A second electrical geared motor 15, housed inside the enlargement 13, in the way shown in FIG. 9, and a worm screw system 16 are provided to turn the front board 14 between the erected position and the folded position.

The lateral sides of the platform 3 are connected by means of an articulated parallelogram linkage system formed by two pairs of articulated longitudinal arms 17 and a mobile unit, generally indicated with numeral 18, which also slides with the platform 3 along the sides 5 of the supporting frame 2. This mobile unit 18 essentially comprises a crossbar 19, operatively connected to the worm screw system 9, operated by the motor 8, which is connected to a third electrical geared motor 20 arranged essentially in central position. This geared motor operates two screw jacks 21, arranged to multiply the torque of the motor 20, meshing with the respective worm screws 22, connected to a pair of respective connecting rods, or rocker arms, 23 fitted on the extremity of a transversal torsion bar 24. Said transversal torsion bar 24 synchronises the movement of the two connecting rods 23 for controlling the two articulated parallelogram arms 17 so to obtain the downwards rotation to the position illustrated in FIGS. 5 and 6 and the upwards rotation to the position illustrated in FIGS. 7 and 8 from the horizontal configuration shown in FIGS. 1 to 4. A lowered position of the platform 3 corresponds to the downwards rotation related to the supporting frame 2, while the upwards rotation corresponds to a raised condition of said platform 3.

Figure 7:
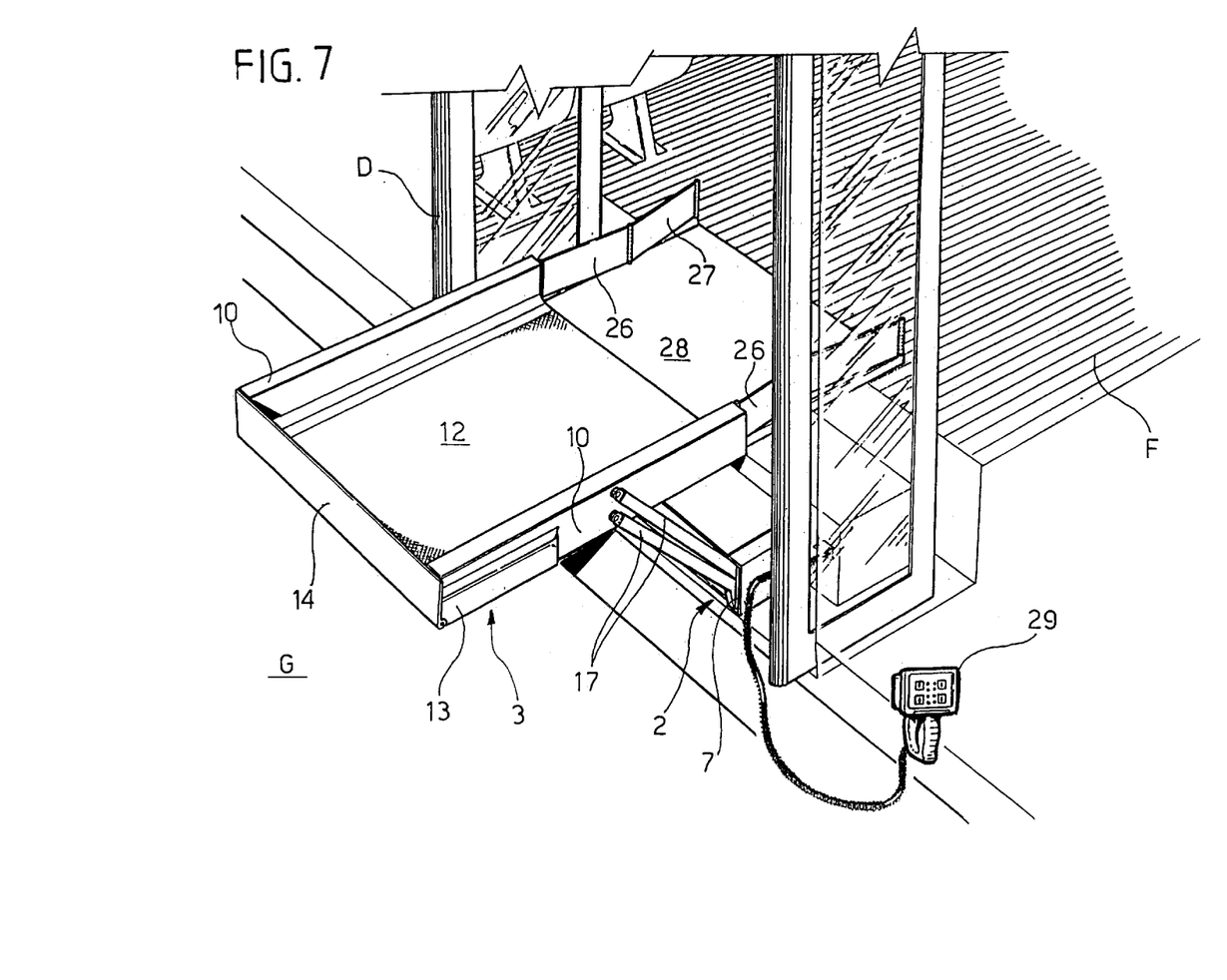
FIG. 7 is a similar view to FIG. 1 showing the lifting device in lifted position with the rear extension in extracted position.
Figure 8:
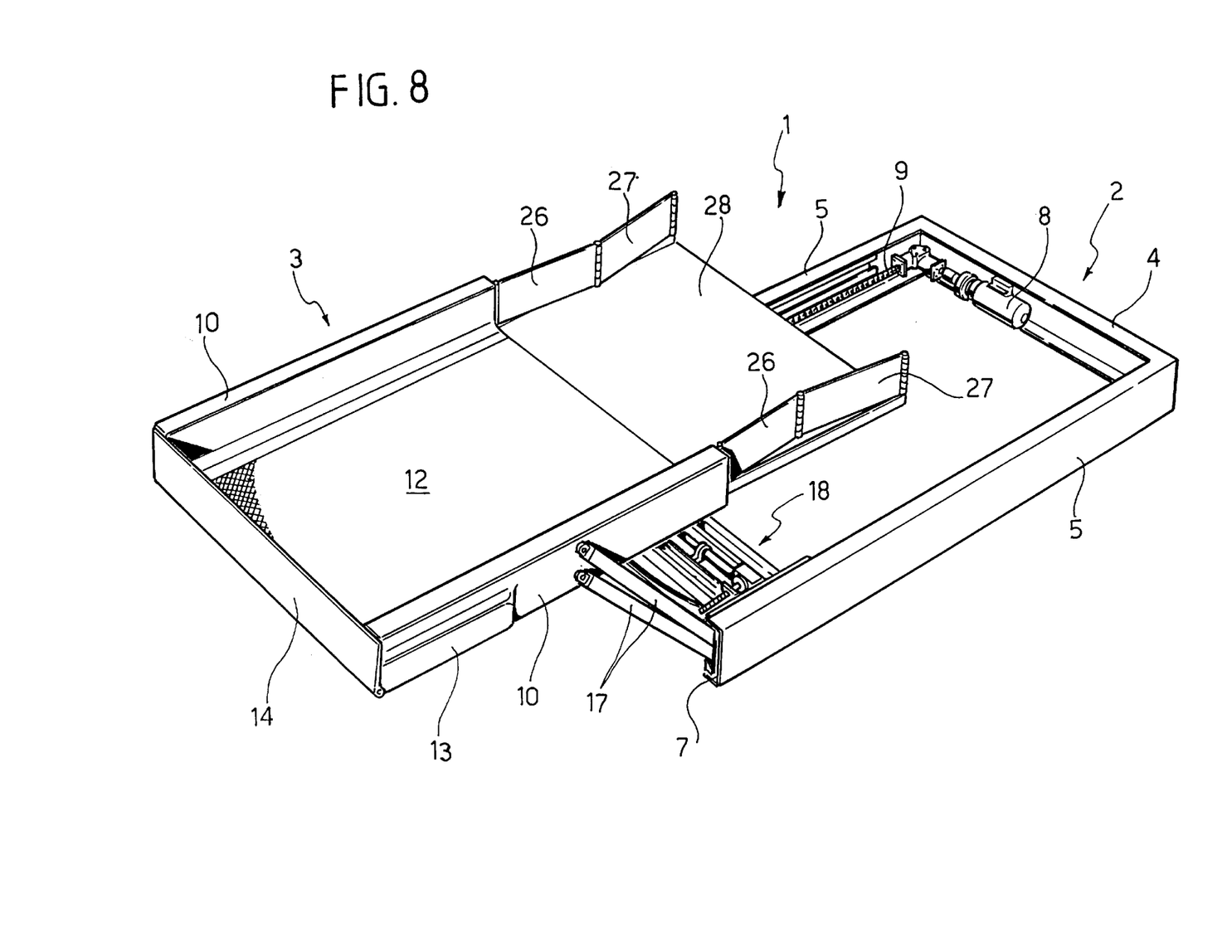
FIG. 8 is a similar view to FIG. 2 showing the lifting device in the lifting condition in FIG. 7.

The rear side of the platform 3 consists of a board 25 mobile between a closed position, shown in FIGS. 2–6, in which it extends transversally with respect to the FIGS. 7 and 8. This rear board 25 is actually formed by two pairs of articulated elements 26, 27, the first of which pivots on the rear extremities of the lateral sides 10 and the second of which pivots on an extension 28 of the base 11 of the platform 3. This extension 28 slides telescopically with respect to the base 11 between a retracted position, shown in FIGS. 2 to 6, and an extracted position, shown in FIGS. 7 and 8, in which it acts as a rear slide for the platform 3, according to the method illustrated below.

The movement of the sliding extension 28 between the retracted and extended positions is also controlled by an electrical geared motor, not illustrated in the drawings, similar to the geared motor 15 described above related to the worm screw system.

Figure 10:
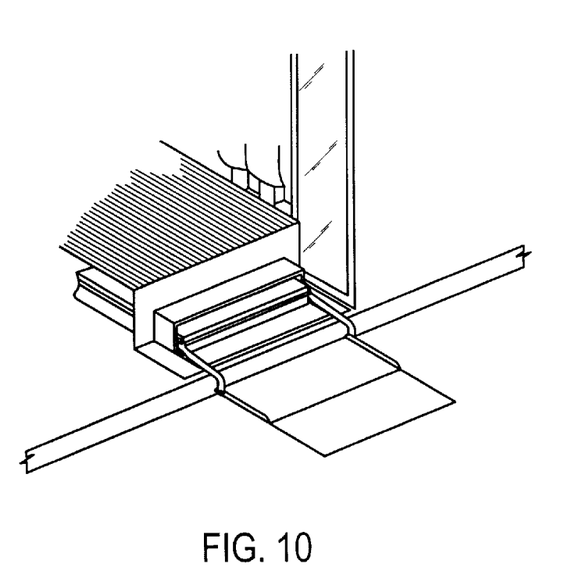
FIGS. 10 and 11 are perspective and scaled down views of two variants of the lifting device according to this invention.

It must be emphasised that both the base 11 and the extension 28 may be made of multiple elements forming the respective extensible and retractable telescopic structures instead of each being made of a single element. An arrangement of this sort (schematically illustrated in FIG. 10 according to the base 11 of the platform 3) considerably reduces the volume of the lifting device 1.

Figure 11:
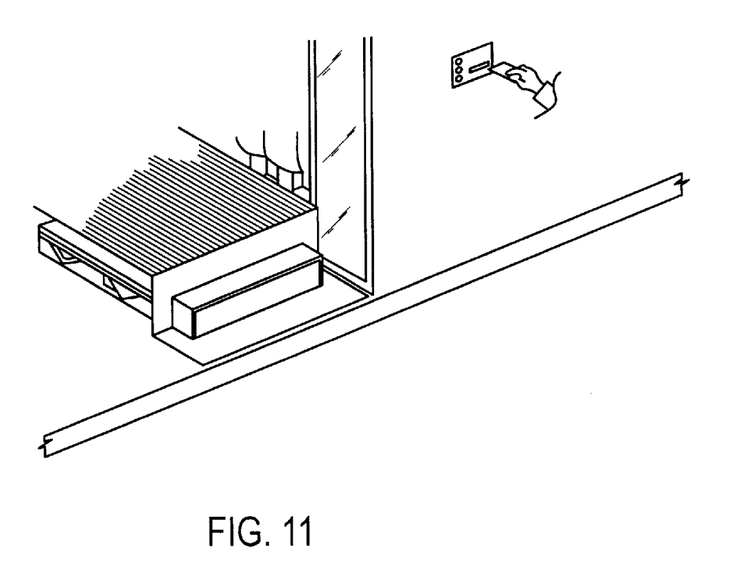

The electrical actuators described above are connected to a control unit, not illustrated in the drawings because known by experts of the sector, for controlling the operation according to a sequential phased cycle. For controlling this cycle, the lifting device 1 according to the invention is conveniently equipped with a remote control unit, for example of the type indicated by numeral 29 in the drawings. This unit may consist of an equivalent remote control device, also of the type employing a magnetic card (as schematically shown in FIG. 11), radio-frequency or infrared remote control, or similar.

The control logic of the lifting device 1 according to this invention can acknowledge the presence of the disabled person aboard. The system arranges and operates the devices normally provided aboard vehicles for safely fastening the wheelchair, which may also fold away to avoid hindrance and obstacles to passengers when no disabled person is aboard.

The operation of the lifting device is described below.

Normally, i.e. when its use is not required, the lifting device 1 is completely folded away inside the step S.

Figure 1:
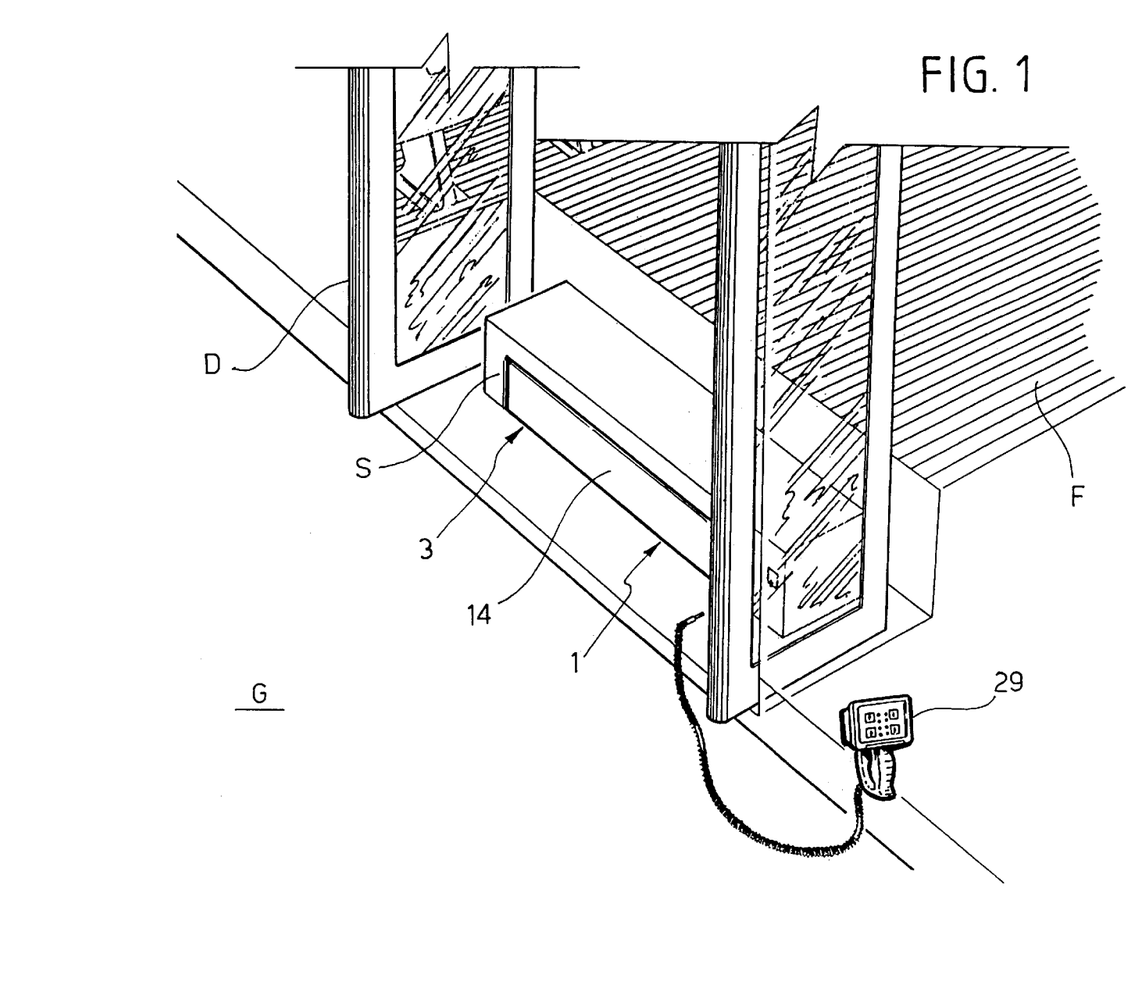
FIG. 1 is a perspective schematic view shows an example of application of the lifting device according to this invention on a bus, where the lifting device is shown in an inoperative, retracted position.
Figure 2:
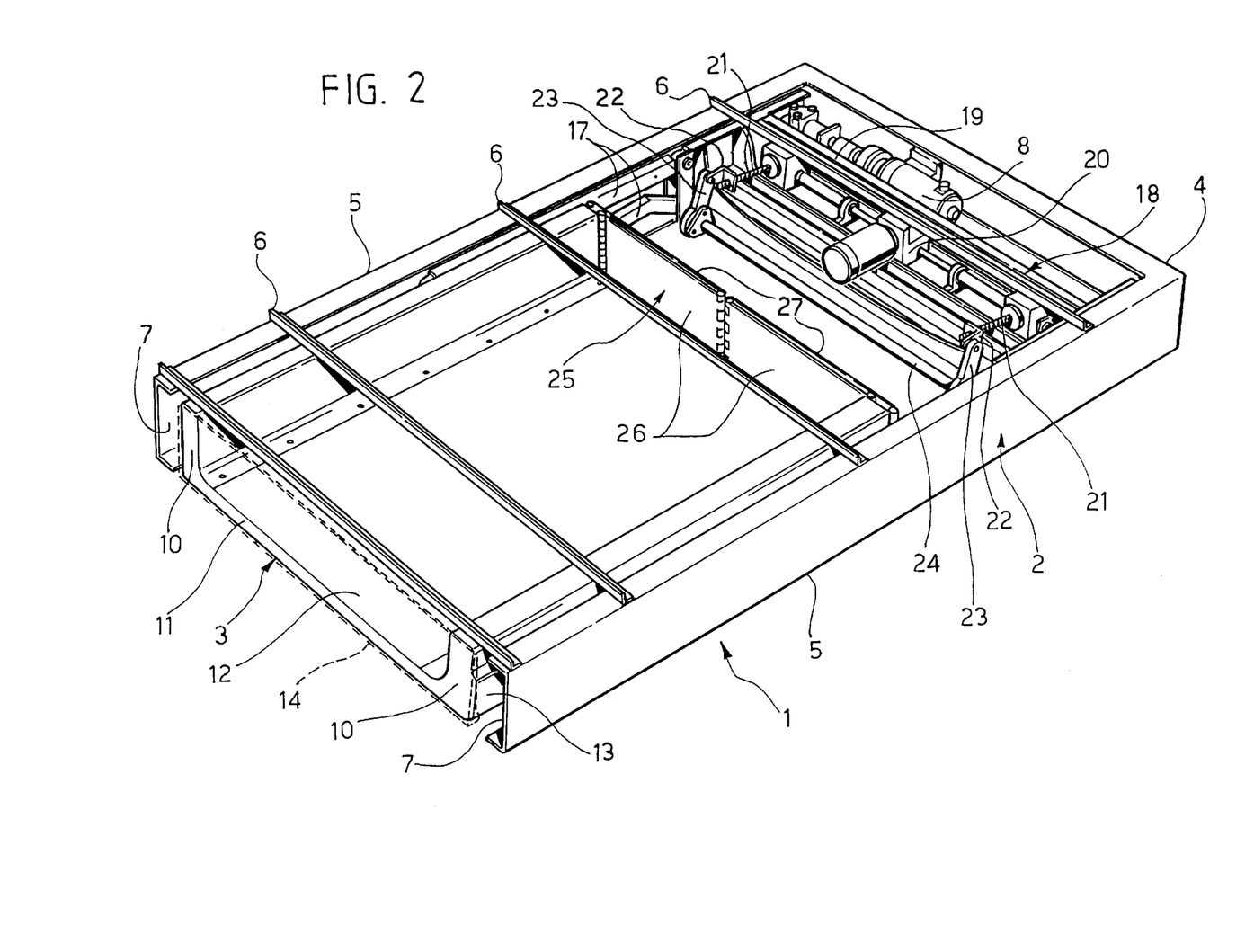
FIG. 2 is a perspective view on a larger scale of the lifting device in the retracted position of FIG. 1.

When a disabled person in a wheelchair requires use, by means of the remote control 29 or similar control device, firstly the geared motor 8 is activated which, via the worm screw unit 9, makes unit 18—and, consequently, the platform 3—slide with respect to the supporting frame 2 from the retracted position of FIGS. 1 and 2 to the extracted position of FIGS. 3 and 4. In this way, the platform 3 is folds out from inside the frame 2 and, consequently, from the step S, with the arms 17 of the articulated parallelogram systems horizontal, the front board 14 erect and the rear board 25 closed.

From this position, the operation of the geared motor 20 causes the downwards rotation of the arms 17 in the articulated parallelogram system, by means of the connecting rods 23 and the torsion bar 24, to rest the platform 2 on the ground, indicated with reference G, i.e. on the disabled person's level. Having reached this position (FIGS. 5 and 6), the geared motor 15 controls, via the worm screw system 16, the rotation of the front board 14 from the raised position to the lowered position shown in FIGS. 5 and 6, so to form a slide or ramp allowing comfortable access of the wheelchair on the platform 3.

Consequently, the front board 14 is returned to the lifted position, and the geared motor 20 is operated again to the control the upwards rotation of the arms 17 of the articulated parallelogram system, so to arrange the platform 3 in the raised position shown in FIGS. 7 and 8. In this position, the platform 3 is arranged essentially on the level of the floor F of the bus, or on a slightly higher level. To allow the passage of the wheelchair from the platform 3 to the floor F, the extension 28 is moved from the retracted position to the extracted position, illustrated in FIGS. 7 and 8, in which it acts as a rear slide connecting the platform 3 and the floor F. By effect of this movement, the articulated elements 26, 27 of the rear board 25 are distended, arranging essentially longitudinally, as also shown in FIGS. 7 and 8, so to allow the passage of the wheelchair, doubling as lateral guiding boards.

Finally, the platform 3 is returned, after the extension 28 returns to the starting position, to the retracted condition inside the supporting frame 2 and, consequently, the step S.

Obviously, the disabled person will be lowered to the ground level by reversing the sequence of operation described above.

It appears obvious that the lifting device according to this invention is extremely practical, functional and relatively simple from the construction point of view, considering that no hydraulic actuators and respective service devices are implemented.

Naturally, numerous changes can be implemented to the construction and forms of embodiment of the invention herein envisaged, all comprised within the context of the concept characterising this invention, as defined by the following claims.

As mentioned above, the lifting device according to this invention can be applied in an equally advantageous way to any type of public transport vehicle, in addition to fixed installations, such as museums, public buildings, etc.

What is claimed is:

1. A lifting device for disabled people designed to be permanently installed at a location for overcoming a difference in level between a lower surface and an upper surface, comprising:

a supporting frame mounted beneath said upper surface, a sliding foldaway platform movable between a retracted position and an extracted position with respect to said supporting frame and also movable in said extracted position between a lowered condition in which the platform rests on said lower surface and a raised condition in which the platform is substantially arranged at the level of said upper surface, articulated parallelogram linkage means connected between said platform and said frame and first electrically actuated means for moving said platform between said retracted position and said extracted position and second electrically actuated means for moving said platform by means of said articulated parallelogram linkage means between said lowered condition and said raised condition, wherein said platform is equipped with a rear extractable extension slidably mounted underneath the platform for movement between a retracted position and an extracted position in which the extension acts as a rear ramp for engaging said upper surface and wherein said sliding extension is provided with a rear board which can move between a closed position and an open position by effect of the movement of said sliding extension between said retracted position and said extracted position respectively.

2. A device according to claim 1 wherein said platform is provided with a front board movable between an erected position and a folded position in which the front board acts as a front ramp to facilitate access from said lower surface onto said platform.

3. A device according to claim 1 wherein said first electrically actuated means comprises a first worm screw actuator operated by a first electrical motor and a mobile unit which can move along internal guides of said supporting frame by means of said worm screw actuator and wherein said second electrically actuated means is comprised of a second worm screw actuator operated by a second electrical motor for operating said articulated parallelogram linkage between said lowered condition and said raised condition.

4. A device according to claim 1 wherein the lifting device is mounted in an access step of a vehicle beneath a floor in the vehicle.

* * * * *